United States Patent [19]
Clendening, Jr. et al.

[11] Patent Number: 5,925,286
[45] Date of Patent: Jul. 20, 1999

[54] GAS GENERATING SYSTEM FOR CHEMICAL LASERS

[75] Inventors: Charles W. Clendening, Jr., Torrance; William D. English, Orange; Martin H. Mach, Venice, all of Calif.; Trecil D. Dreiling, Auburn, Wash.

[73] Assignee: TRW Inc., Redondo Beach, Calif.

[21] Appl. No.: 08/982,174

[22] Filed: Dec. 1, 1997

Related U.S. Application Data

[62] Division of application No. 08/762,180, Dec. 9, 1996, Pat. No. 5,859,863, which is a division of application No. 08/647,610, May 13, 1996, Pat. No. 5,624,654.

[51] Int. Cl.⁶ .................................................. C09K 3/00
[52] U.S. Cl. ........................................................ 252/183.14
[58] Field of Search ............................ 423/579; 372/55, 372/89; 252/183.14

[56] References Cited

U.S. PATENT DOCUMENTS

| | | |
|---|---|---|
| 4,246,252 | 1/1981 | McDermott et al. . |
| 4,318,895 | 3/1982 | Richardson et al. . |
| 4,342,116 | 7/1982 | MacKnight et al. . |
| 4,461,756 | 7/1984 | Rockenfeller . |
| 4,558,451 | 12/1985 | McDermott et al. . |
| 4,643,889 | 2/1987 | Uchiyama et al. . |
| 4,653,062 | 3/1987 | Davis et al. . |
| 4,668,498 | 5/1987 | Davis . |
| 5,378,449 | 1/1995 | Dinges . |
| 5,417,928 | 5/1995 | McDermott . |
| 5,516,502 | 5/1996 | Dickerson . |
| 5,624,654 | 4/1997 | Clendening, Jr. et al. ............. 423/579 |

OTHER PUBLICATIONS

Thayer, et al., Paper AIAA 94–2454, 25th AIAA Plasmadynamics and Lasers Conference, Jun. 20–23, 1994.

*Primary Examiner*—Wayne Langel
*Attorney, Agent, or Firm*—Michael S. Yatsko

[57] ABSTRACT

A system for preparing excited molecular oxygen in the excited singlet-delta electronic state for use in a chemical laser that minimizes salt formation utilizing the common ion effect. In one version, basic hydrogen peroxide is formed by combining $H_2O_2$ and at least two bases. In another version of the invention, the basic hydrogen peroxide is reacted with a gas containing at least two halogen species.

11 Claims, 1 Drawing Sheet

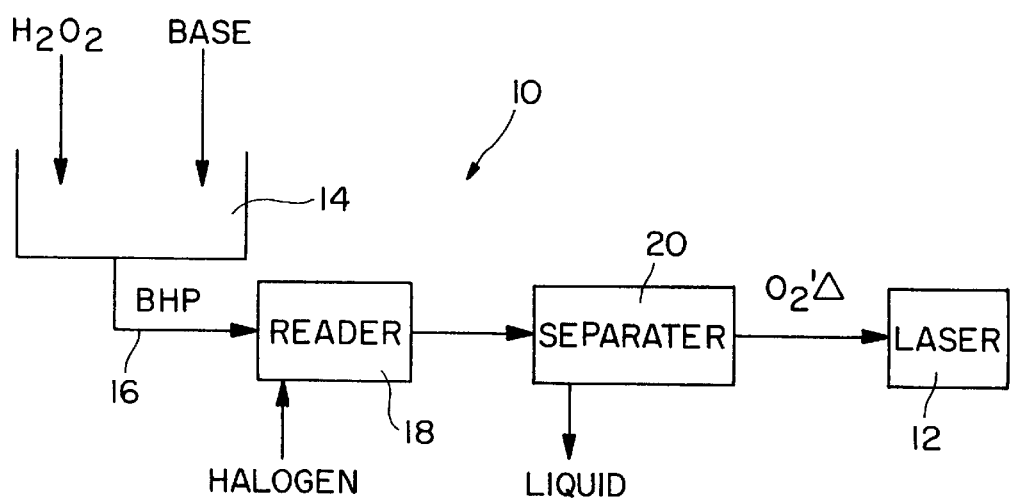

GAS GENERATING SYSTEM FOR CHEMICAL LASERS

This is a divisional of U.S. patent application Ser. No. 08/762,180, filed Dec. 9,1996, U.S. Pat. No. 5,859,863 which is a divisional of application Ser. No. 08/647,610,filed May 13, 1996, U.S. Pat. No. 5,624,654.

BACKGROUND

This invention relates to chemical lasers and, more particularly, to a system for generating molecular oxygen in the excited singlet-delta electronic state.

Chemical laser systems have proven to be very useful for a number of applications, and considerable interest in their development has evolved. In a chemical laser, the energy required to produce the population inversion necessary for lasing is supplied by chemical reactions. In some cases the lasing species is produced directly by a single chemical reaction. In other cases an excited state of a chemical species is produced chemically and through a combination of chemical reactions and energy transfer a population inversion is produced in another chemical species. An optical laser cavity is then used to produce lasing. For example, in chemical oxygen iodine laser (COIL) systems, basic hydrogen peroxide (BHP) is reacted with a halogen, typically chlorine, to yield electronically excited singlet-delta oxygen, $O_2(^1\Delta)$. This unstable state of excited oxygen can dissociate molecular iodine and transfer its energy to atomic iodine, the actual lasing species of COIL.

The BHP, which is an unstable solution of aqueous alkaline hydrogen peroxide, is typically generated by reacting an aqueous metal hydroxide, usually potassium hydroxide, with an excess of hydrogen peroxide.

As described in U.S. Pat. No. 5,378,449, the BHP, when reacted with a halogen gas, such as chlorine, produces the excited oxygen, with depletion of the BHP, and generation of salt, such as potassium chloride when the hydroxide is potassium hydroxide and the halogen gas is chlorine.

A typical reaction to form BHP ($HO_2^-$) is:

$$MOH + H_2O_2 \rightarrow M^+ + HO_2^- + H_2O \quad (1)$$

where M is an alkali metal from Group IA of the periodic table.

Typical reactions to form the excited oxygen are:

$$X_2 + HO_2^- \rightarrow O_2(^1\Delta) + 2X^- + H^+ \quad (2)$$

  (3)

where X is a halogen, typically chlorine.

Unfortunately, after consumption of a small portion of the BHP reactant, a concentrated salt solution can result, with salt precipitation, particularly when the system is operating at low temperatures. The salt is formed from the $M^+$ from reaction (1) and the $X^-$ from reaction (2), yielding MX. The precipitation of the salt releases heat and removes very substantial fractions of the BHP reactant as a hydrate, possibly as much as 2 or 3 times the pure salt mass. In unfavorable situations, one-third of the BHP may be lost.

For example, in a typical system, 8 moles of $H_2O_2$ are combined with 7 moles of potassium hydroxide in a liter of water, and salt formation can occur when as a little as 10% of the BHP is reacted with chlorine.

There are other problems associated with salt formation. The salt is very difficult to quickly remove and its presence can clog feedlines. This is a significant problem when it is desirable to have a closed-loop operation and it is necessary to regenerate the BHP.

Formation of salt can be a significant problem in a particular type of COIL system, which utilizes a transverse uniform droplet oxygen generator (TUDOG), as described in Paper AIAA 94-2454, by Thayer et al., 25th AIAA Plasmadynamics and Lasers Conference, Jun. 20–23, 1994. In the TUDOG system, it is necessary to have high flow rates of the BHP through very small orifices. These orifices can be plugged easily by salt crystals. Further, the salt can also foul in-line heat exchangers.

Accordingly, there is a need for a system for generating molecular oxygen in the excited singlet-delta electronic state which utilizes a high percentage of the BHP that is formed, without any significant insoluble salt formation.

SUMMARY

The present invention is directed to a system that satisfies these needs. The system makes use of the common ion effect so that as much as 60%, and preferably as much as 80% of the BHP is used, with substantially no insoluble salt being formed.

According to the common ion effect, the solubility of salts in an aqueous solution can be increased when a system contains two salts with a common ion. For example, the combined solubility of potassium chloride and sodium chloride in water can be higher than the maximum solubility achievable with either potassium chloride or sodium chloride by itself.

There are two versions of the present invention that utilize the common ion effect. In the first version, molecular oxygen is prepared in the excited singlet-delta electronic state for use as an energizing reactant for a chemical laser by combining $H_2O_2$ and at least two bases, $B_1$ and $B_2$, to form a reaction mixture containing basic hydrogen peroxide. The bases are selected from the group consisting of alkali metal bases, alkaline earth metal bases, and nitrogen containing bases. The total amount of a base is no more than 1 mole per mole of $H_2O_2$. The molar ratio of $B_1$ to $B_2$ is selected to maximize the amount of BHP that can be consumed without forming an insoluble salt, and is typically from about 3:1 to about 1:1. The basic hydrogen peroxide is then combined with a halogen gas to produce excited molecular oxygen.

More than two bases can be used. For example, the $H_2O_2$ can be combined with at least three bases, $B_1$, $B_2$ and $B_3$, where the molar ratio of $B_1$ to $B_2$ is from about 3:1 to about 1:1, and the molar ratio of $B_1$ to $B_3$ is from about 3:1 to about 1:1.

In the second version of the invention, rather than using two bases, the halogen gas contains at least two halogen species $X_1$ and $X_2$, selected from the group consisting of chlorine, bromine, and bromine chloride. The molar ratio of $X_1$ to $X_2$ is from about 2:1 to about 1:1.

The two versions of the invention can be combined in a system where multiple bases and multiple halogen species are used.

The system of the present invention also includes the composition of matter that contains the basic hydrogen peroxide resulting from combining $H_2O_2$ and at least two bases.

DRAWINGS

These and other features, aspects, and advantages of the present invention will become better understood from the following description, appended claims, and accompanying drawings which schematically represent the system according to the present invention.

DESCRIPTION

With reference to the single FIGURE, a singlet-delta oxygen generator 10 is used for producing singlet-delta oxygen for use in a laser, such as COIL 12, where the excited molecular oxygen is introduced into an optical cavity containing a lasing media to create a lasing action. Of course, the oxygen generator 10 can be utilized in any circumstance where a source of singlet-delta oxygen is required.

A mixture of hydrogen peroxide and base is combined in a chamber 14, and either immediately or after a storage period, is sent in liquid form through a conduit 16 to a reactor 18 to be combined with a halogen containing gas. If desired, a source of helium or nitrogen gas can be used as a carrier to maintain desired pressure and/or temperature.

The liquid mixture and the halogen react to produce a mixture of singlet-delta excited oxygen and partially reacted BHP. In addition, to the initial reactants, as well as intermediate reactants, dissolved salt can be found in the reactor 18.

In some configurations a separator 20 can be used for separating the excited oxygen from other materials present. The separator can, for example, include a rotating centrifugal separator, and/or a freezer comprising a one pass heat exchanger for freezing out any water present. The separated excited oxygen is then sent on to the laser 12.

The present invention is not limited to use with the system shown in the Figure. The present invention has value in many different types of excited oxygen generators, including the TUDOG system discussed above, as well as the systems described in U.S. Pat. Nos. 4,246,252; 4,342,116; 4,461,756; 4,558,451; 4,643,889; 4,653,062; and 4,668,498.

In practicing the first version of the invention, at least two bases, $B_1$ and $B_2$, are used, for example, three bases, $B_1$, $B_2$, and $B_3$ can be used. The bases are selected from the group consisting of alkali metal bases, alkaline earth metal bases, and nitrogen containing bases. The alkali metal bases are bases formed from Group IA of the Periodic Table, namely lithium, sodium, potassium, rubidium, cesium, and francium hydroxide. The alkaline earth metal bases are bases formed from Group IIA of the Periodic Table, namely calcium, barium, strontium, and radium hydroxide.

The nitrogen containing base can be any nitrogen-containing base as described in U.S. Pat. No. 4,318,895, including those formed with $NH_3$, phenethylamine, ethanolamine, diethylamine, propylamine, triethylene diamine, methylamine, or dipropylamine.

The preferred bases are the alkali metal bases, and particularly lithium hydroxide, sodium hydroxide, and potassium hydroxide.

The molar ratio of the bases is selected to maximize the amount of BHP available for the reaction without formation of any significant amount of insoluble salt, i.e., substantially no insoluble salt is formed. The amount of insoluble salt that can be tolerated in any given circumstance depends on the apparatus used. For example, if very small orifices are used in the reactor system, then any insoluble salts could plug the system. On the other hand, in a system Where plugging is not a serious problem, small amounts of insoluble salts can be tolerated.

Generally, the molar ratio of $B_1$ to $B_2$ is from about 3:1 to about 1:1, and preferably is from about 1.5:1 to about 1:1.

In a three-base system, where there are bases $B_1$, $B_2$, and $B_3$, preferably the molar ratio of $B_1$ to $B_2$ is from about 3:1 to about 1:1 and the molar ratio of $B_1$ to $B_3$ is from about 3:1 to about 1:1; and more preferably the molar ratio of $B_1$ to $B_2$ is from about 2:1 to about 1:1 and the molar ratio of $B_1$ to $B_3$ is from about 2:1 to about 1:1.

The reaction in the reactor 14 takes place with an excess of hydrogen peroxide, i.e., the total amount of base added is no more than 1 mole per mole of hydrogen peroxide. In a typical system according to the present invention, the reaction mixture containing the BHP contains at least 5 molar BHP, and at least 60%, and preferably at least 80% of the BHP can be consumed by reaction with halogen gas for formation of substantially no insoluble salts.

Thus, a BHP solution of about 5.5 to 6 molarity can be formed by combining 5.5 moles per liter of base (NaOH and KOH in a molar ratio of NaOH:KOH of 1.5) with a 10 to 15% excess of $H_2O_2$. This BHP solution can be reacted with $Cl_2$ down to an $O_2H^-$ molarity of approximately 1 without salt formation.

The halogen gas contains a halogen species selected from the group consisting of chlorine, bromine, and bromine chloride, and typically $Cl_2$.

In a second version of the invention, the common ion effect is achieved by using two halogen species in the halogen containing gas. The two halogen species, $X_1$ and $X_2$, are present in a molar ratio of from about 3:1 to about 1:1, and preferably from about 2:1 to 1:1.

The first and second versions of the invention can be combined where multiple bases and multiple halogen species are used.

The temperature for the reaction to form a BHP is typically from −10 to +10° C., and the pH is from 8 to 13, or even higher. Similarly, the temperature of the reaction to form the excited oxygen is typically from −10 to 10° C. The pressure at which $O_2 (^1\Delta)$ is made is typically from 10 to 100 torr.

EXAMPLE 1

A chemistry experiment was performed to simulate the end products of a method performed according to the present invention. A composition was formed with the following constituents:

1.4 molar LiOH
1.5 molar KOH
3.1 molar NaOH
6.0 molar $H_2O_2$

The composition was reacted with sufficient $Cl_2$ to reduce the BHP concentration from 6 to 2 molar. The composition was cooled to −20° C., and no salt formation was noted.

EXAMPLE 2

The following BHP composition was prepared and experimentally reacted with chlorine in a sparger singlet-delta generator over the desired molarity range (5.85 to 1 molar) before salt formation occurred:

Initial base 5.85 molar, peroxide 6.09 molar, Base molar ratio's NaOH/LiOH=3.0 KOH/LiOH=2.3

Although the present invention has been described in considerable detail with reference to certain preferred versions thereof, other versions are possible. Therefore, the scope of the appended claims should not be limited to the description of the preferred versions contained herein.

What is claimed is:

1. A composition of matter for generating molecular oxygen in the excited singlet-delta electronic state comprising a mixture of (i) basic hydrogen peroxide resulting from combining $H_2O_2$ and at least two different bases $B_1$ and $B_2$, and (ii) at least one halogen species, the bases being selected from the group consisting of alkali metal bases, alkaline earth metal bases, and nitrogen containing bases, wherein at least one of the bases is an alkali metal base, the total amount of bases being no more than one mole per mole of $H_2O_2$.

2. The composition of claim 1 where the bases are selected from the group consisting of sodium hydroxide, potassium hydroxide and lithium hydroxide.

3. The composition of claim 1 wherein the molar ratio of $B_1$ to $B_2$ is from about 3:1 to about 1:1.

4. The composition of claim 1 where the basic hydrogen peroxide results from combining hydrogen peroxide with at least three different bases, $B_1$, $B_2$ and $B_3$, wherein $B_3$ is selected from the group consisting of alkali metal bases, alkaline earth metal bases and nitrogen containing bases.

5. The composition of claim 4 wherein the molar ratio of $B_1$ to $B_2$ is from about 3:1 to about 1:1, and the molar ratio of $B_1$ to $B_3$ is from about 3:1 to about 1:1.

6. The composition of claim 1, wherein both bases are alkali metal bases.

7. A composition of matter for generating molecular oxygen in the singlet-delta electronic state comprising a mixture of (i) basic hydrogen peroxide resulting from combining $H_2O_2$ with at least one base and (ii) at least two different halogen species, $X_1$ and $X_2$, the bases being selected from the group consisting of alkali metal bases, alkaline earth metal bases, and nitrogen containing bases, the total amount of base being no more than one mole per mole of $H_2O_2$.

8. The composition of claim 7 wherein the basic hydrogen peroxide results from combining $H_2O_2$ with at least two different bases, $B_1$ and $B_2$, at least one of the bases being an alkali metal base.

9. The composition of claim 7 wherein $X_1$ and $X_2$ are selected from the group consisting of chlorine, bromine, and bromine chloride.

10. The composition of claim 7 wherein the molar ratio of $X_1$ to $X_2$ is from about 3:1 to about 1:1.

11. The composition of claim 10 wherein the molar ratio of $X_1$ to $X_2$ is from about 2:1 to about 1:1.

* * * * *